Sept. 14, 1965  H. BÄHRING  3,206,549
CONTROL METHOD AND SYSTEM
Filed March 3, 1961  3 Sheets-Sheet 1
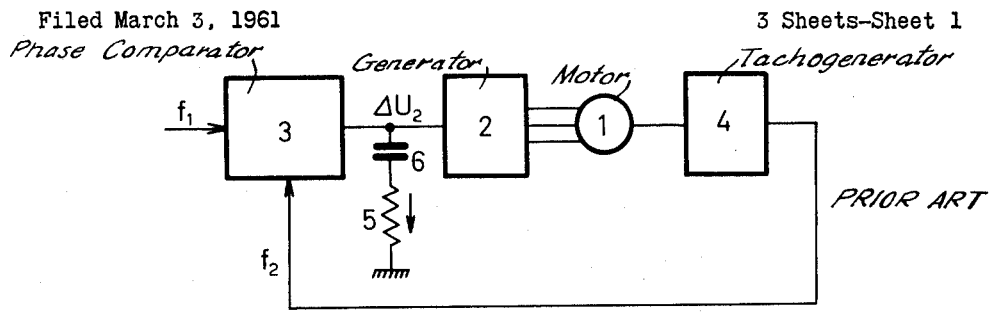
Fig. 1
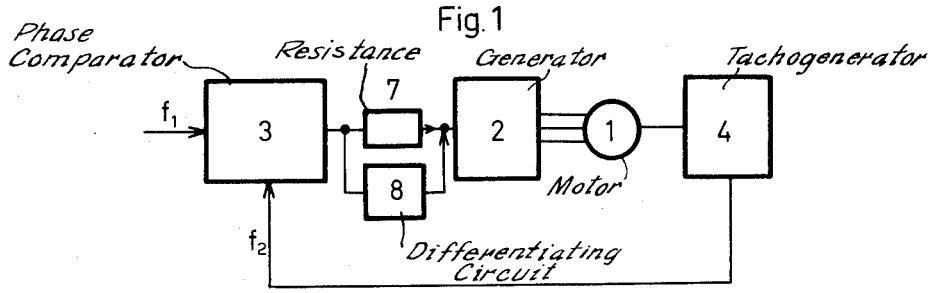
Fig. 2
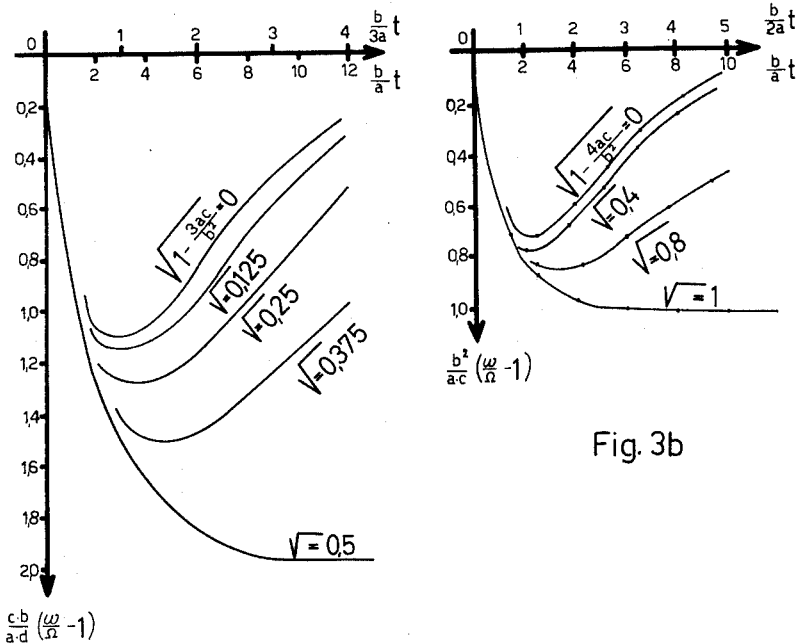
Fig 3a
Fig. 3b
Inventor:
Herbert Bähring
by Toulmin & Toulmin
Attorneys

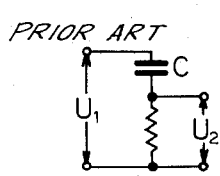
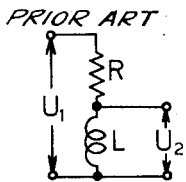
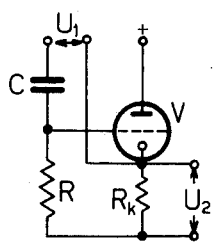
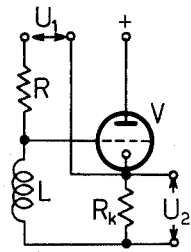
Fig.4a    Fig.4b    Fig.5a    Fig.5b
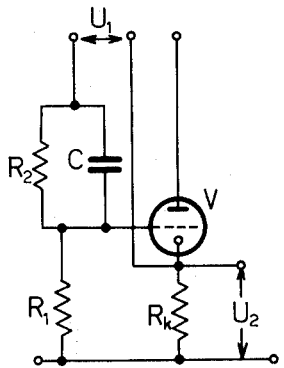
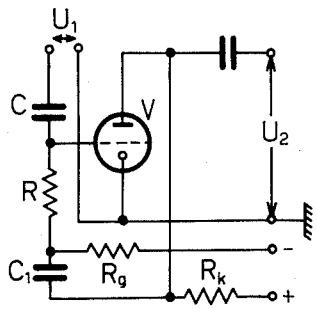
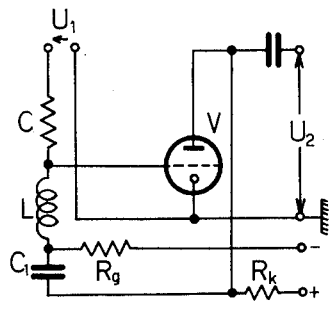
Fig.6    Fig.7a    Fig.7b
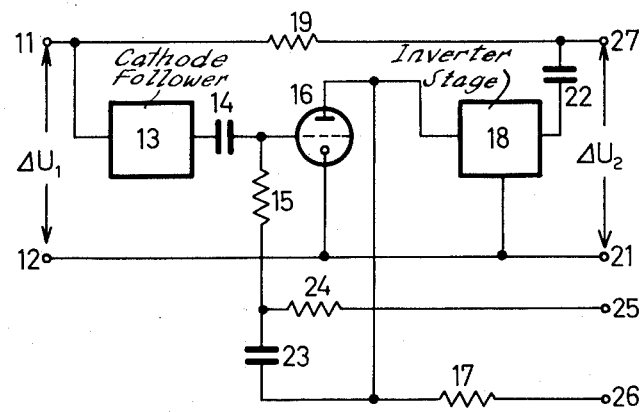
Fig.8
Inventor:
Herbert Bähring
by Toulmin & Toulmin
Attorneys Sept. 14, 1965  H. BÄHRING  3,206,549
CONTROL METHOD AND SYSTEM
Filed March 3, 1961  3 Sheets-Sheet 3

Inventor:
Herbert Bähring
by Toulmin & Toulmin
Attorneys

United States Patent Office 3,206,549
Patented Sept. 14, 1965

3,206,549
CONTROL METHOD AND SYSTEM
Herbert Bähring, Darmstadt, Germany, assignor to
Fernseh G.m.b.H., Darmstadt, Germany
Filed Mar. 3, 1961, Ser. No. 93,125
Claims priority, application Germany, Mar. 5, 1960,
F 30,686; July 20, 1960, F 31,707
1 Claim. (Cl. 178—69.5)

The present invention relates to a control system for video tape recorders, and in particular to a system and arrangement for the automatic control of the angular position of the rotor of the driving motor for the head recorder of video tape recorders.

Many forms of an automatic control system have been devised wherein the magnitude of one of the conditions of operation is automatically measured. This measured result is then compared with a standard or theoretical quantity. This comparison may produce a voltage which is proportional to the difference between the operating conditions and the standard. This proportional voltage then actuates a regulating member which acts to return the operation condition to the predetermined standard.

The restoring force of the regulating member tends to compensate for the deviation from the standard. This restoring force should preferably be a non-oscillating aperiodic one and should occur as quickly as possible. By having a rapidly occuring restoring force large deviations from the standard are prevented since the restoring force will tend to go into action as soon as a small deviation in the operating condition occurs. This restoring process depends not only on the control circuit but also upon the regulating quantities of the circuit which depend on time. The precise nature of the transient compensating process cannot be stated until the differential equation of this process is known. As a general rule this differential equation has the following form:

$$(1) \qquad \sum_{n=0}^{n} a_n \cdot y^{(n)} = 0$$

In this equation $y$ to the $n^{\text{th}}$ power is the $n^{\text{th}}$ differential of the variables of the differential equation depending upon the time and $a_n$ are coefficients depending on the nature of the circuit.

It is known that no member having an order less than $n$ can be omitted from this differential equation if the compensating process is to be aperiodic. However, this condition alone is not sufficient but other secondary conditions must also be satisfied to achieve this aperiodic compensating process. The number of these secondary conditions becomes larger as the order of the differential equation corresponding to the regulating process increases.

The requirements for this compensating or restoring process are extremely high when used in various television techniques. In video tape recorders the control deviation of the motor of the head recorder should be less than $\frac{1}{60,000}$ of one revolution. It is therefore apparent that it is a very important task to attenuate the control process. In this field the satisfaction of the various secondary conditions which would occur with differential equations of a high order was considered as a necessary evil but by no means limited.

For the purpose of suppressing oscillations in restoring deviations in the recording head motor most control circuits comprise an attenuation compensator consisting of a capacitor and a resistance in series and connected in parallel to the circuit of the control potential. The control process for this arrangement would occur based on a differential equation of the third order and the two secondary conditions can be met by the proper alignment of the R–C attenuator and the degree of amplification of the control arrangement.

It is therefore the principal object of this invention to provide a novel and improved control system for maintaining constant the speed of a rotating member;

It is a further object of this invention to provide an improved control system for controlling the angular position of motors for recording television signals on tapes;

It is an additional object of this invention to provide an apparatus and method for combining the control potential of a potential which is proportional to the phase deviation of a recording head and of an auxiliary voltage derived from said control potential;

It is another object of this invention to provide an electric circuit for obtaining an auxiliary voltage in the form of a precisely differentiated potential.

The present invention essentially comprises a structure for producing a series of impulses from the rotary movement of the electric motor. The phase relationship of the pulses is a function of and has a fixed relation to the phase relationship of the rotor of this motor. These impulses are then compared with a train of synchronizing pulses and a control potential is obtained from this comparison of the two trains of pulses. A differentiation circuit is then provided to obtain an additional auxiliary voltage from the control potential.

In a preferred embodiment of this invention both the control potential and the auxiliary potential act upon the rotor. This is done either directly by using the eddy current brake coupled to the rotor or indirectly through the generator supplying the supply current for the motor.

In this invention the period during which a control potential is developed by a comparison of the trains of pulses is less than one tenth of the smallest control period which would be required. As a result, the comparison of the phase of the rotor occurs more than one thousand times per second and preferably approximately 16,000 times per second.

When it is desired to play back the recorded television signals from the magnetic tape it is advantageous to use as synchronizing impulses the line of pulses supplied by a pulse generator of the television system.

As a result of the control system of the present invention only a small number of secondary conditions must be dealt with. This result is primarily due to the use of the auxiliary voltage in the form of a differentiated control potential. Accordingly, the increase of the attenuation and the decrease of the control time can be obtained.

When this control system is applied to the control of motors of head recorders of video tape recorders the high requirements with respect to the accuracy and non-oscillation of the control system can be readily met.

Other objects and advantages of this invention will be apparent upon reference to the accompanying description when taken in conjunction with the following drawings, wherein—

FIGURE 1 is a schematic diagram of a known circuit for controlling the phase relationship of the motor of a head recorder used in magnetic video tape recording;

FIGURE 2 is a schematic diagram of the circuit according to the present invention for controlling the phase relationship of the driving motor;

FIGURES 3a and 3b are graphs illustrating the time required at the various conditions for adjusting the phase relationship of the motor after application of a braking force onto the motor;

FIGURES 4a and 4b are electrical circuit diagrams of two differentiating circuits both of which provide only an imperfect differentiating effect;

FIGURES 5a and 5b, 6, 7a and 7b are electrical circuit diagrams of differentiating circuits as disclosed in the present invention whereby a precise differentiation of a voltage can be obtained;

FIGURE 8 is an electrical circuit diagram of the differentiating circuit shown in block form in FIGURE 2;

Figure 10:
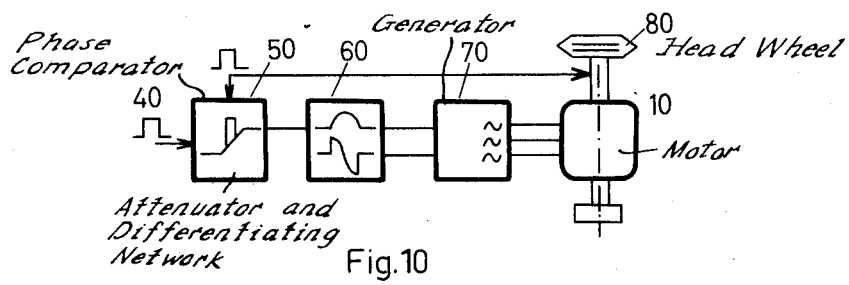
Figure 11:
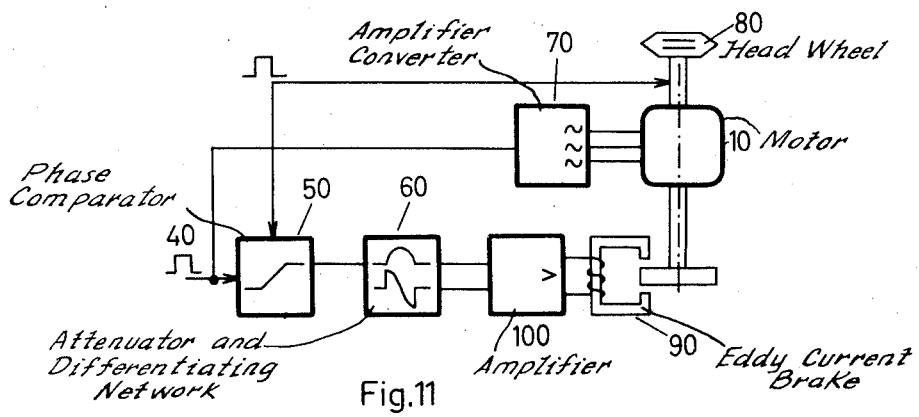

FIGURE 10 is another schematic view showing the motor drive for replaying the television signals previously recorded on a tape together with a circuit for controlling the phase relationship of the supply current to the driving motor; and FIGURE 11 is a schematic diagram of the motor drive and arrangement for replaying television signals previously recorded on a magnetic tape combined with an eddy current brake for controlling the speed of the driving motor.

A specific embodiment and several modifications of this invention will next be described with reference to the foregoing drawings wherein like reference symbols indicate the same parts throughout the various views.

Returning now to FIGURE 1 there is shown a known control circuit provided with conventional attenuation achieved by means of an R–C circuit. In this control circuit a polyphase induction motor 1 is supplied with current from a three-phase generator 2. The frequency of the generator is determined by a control potential obtained in a circuit 3 by means of a phase comparison between a theoretical or standard frequency $f_1$ and a frequency $f_2$ which is a function of the rotary speed of the motor. The theoretical frequency $f_1$ can be supplied by a pulse generator and the frequency $f_2$ by a tachogenerator 4 which is directly conected to the motor 1. A resistance 5 and a capacitor 6 are connected in series between ground and the generator 2 and a circuit 3.

The control potential determined by the attenuating circuit 5 and 6 can be stated as follows:

(2) $$\Delta u_2 = \frac{1}{C}\int \Delta i\, dt + \Delta i \cdot R$$

In this equation C and R represent the magnitudes of the capacitance and resistance, respectively and $i$ is the current passing through this RC member. Whenever the frequencies $f_1$ and $f_2$ differ from each other these frequencies can be compared, e.g. by a self-starting synchronous motor which would correct $f_2$ so as to equal $f_1$.

The control effect from the comparison of the phases is derived from a deviation of the phase relationship of the motor from the phase relationship of a train of synchronizing pulses. This deviation initiates a control process by which the phase of the motor is again synchronized with the phase relationship of the synchronizing pulses or by compensating for the change in the phase relationship of the motor. When the number of revolutions of the motor deviates from the frequency of the generator, a restoring moment $M_R$ is created in the motor. This restoring moment has the following relationship:

(3) $$M_R = m_1 \theta = m_1 \int \omega\, dt$$

In addition, an attenuating moment $M_D$ is created which may be expressed as follows:

(4) $$M_D = m_2 \frac{d\theta}{dt} = m_2 \omega$$

There is also created an inertia torsional moment $M_T$ which can be expressed as follows:

(5) $$M_T = I \cdot \frac{d^2\theta}{dt^2} = I \cdot \frac{d\omega}{dt}$$

As a result, the total torsional moment of the motor will be (6) $$M_D = I \cdot \frac{d\omega}{dt} + m\,\omega + m_1 \int \omega\, dt$$

Accordingly, the following conditions must be met during the regulation process (7)  (1) $$I \cdot \frac{d\omega}{dt} + m_2 \omega + m_1 \int \omega\, dt = -k_3 \Delta u_2$$

(2) $$\Delta u_2 = \frac{1}{C}\int \Delta i\, dt + \Delta i \cdot R$$

(3) $$\Delta i \cdot R = k_0 \Delta \varphi$$

(4) $$\Delta \varphi = \int \omega\, dt - \varphi_1$$

From these conditions as set forth in Equations 7 the following differential equation, which represents the regulating process, can be derived:

(8) $$\underbrace{I}_{a} \cdot \frac{d^3\omega}{dt^3} + \underbrace{m_2}_{b} \cdot \frac{d^2\omega}{dt^2} + \underbrace{(m_1 + k_0 k_1 k_3)}_{c} \frac{d\omega}{dt} + \underbrace{\frac{k_0 k_1 k_3}{RC}}_{d}\omega = 0 \text{ or}$$

$$a \cdot \frac{d^3\omega}{dt^3} + b \frac{d^2\omega}{dt^2} + c \frac{d\omega}{dt} + d\omega = 0$$

A momentary braking force on the regulating system under the conditions $$\frac{3}{4} < \frac{3ac}{b^2} < 1$$

will enable the frequency to be modified as a function of time $\omega/\Omega$ according to the equation (9) $$\frac{cb}{ad}\left(\frac{\omega}{\Omega} - 1\right) = \frac{e^{-\frac{b}{3a}t}}{\sqrt{1 - \frac{3ac}{b^2}}}\left[e^{-\frac{b}{3a}\sqrt{1-\frac{3ac}{b^2}}t} - e^{+\frac{2b}{3a}\sqrt{1-\frac{3ac}{b^2}}t}\right]$$

The conditions $$\frac{3}{4} < \frac{3ac}{b^2} < 1$$

greatly restrict the choice of $b/3a$.

Therefore, a steady regulation is not possible without attenuation of the motor ($m_2 = b = 0$) because the following relationship will indicate an oscillation:

(10) $$\frac{c}{ad}\left(\frac{\omega}{\Omega} - 1\right) = \frac{1}{\sqrt{-3ac}}\left[e^{-\sqrt{\frac{-c}{3a}}t} - e^{+2\sqrt{\frac{-c}{3a}}t}\right]$$

Proceeding next to FIGURE 2 there is shown a control circuit which is similar to that illustrated in FIGURE 1 but which is based on the present invention. The attenuator 5, 6 of FIGURE 1 is replaced by a resistance 7 combined with a differentiating circuit 8.

The following conditions are met during the regulation process

(11)  (1) $$I \cdot \frac{d\omega}{dt} + m_2 \omega + m \int \omega\, dt = -k_3 \Delta u_2$$

(2) $$\Delta u_2 = k_1 \Delta u_1 + k_2 \frac{d\Delta u_1}{dt}$$

(3) $$\Delta u_1 = k_0 \Delta \varphi$$

(4) $$\Delta \varphi = \int \omega\, dt - \varphi_1$$

From these conditions can be derived the following differential equation of the regulating process

(12) $$\underbrace{I}_{a} \cdot \frac{d^2\omega}{dt^2} + \underbrace{(m_2 + k_0 \cdot k_2 \cdot k_3)}_{b} \frac{d\omega}{dt} + \underbrace{(m_1 + k_0 k_1 k_3)}_{c} = 0 \text{ or}$$

$$a \cdot \frac{d^2\omega}{dt^2} + b \cdot \frac{d\omega}{dt} + c\omega = 0$$

Under the following conditions:

$$0 < \frac{4ac}{b^2} < 1$$

a momentary braking force will initiate a control process based on the solution of the differential equation:

$$(13) \quad \frac{b^2}{ac}\left(\frac{\omega}{\Omega}-1\right)=\frac{e^{-\frac{b}{2a}t}}{\sqrt{1-4\frac{ac}{b^2}}}\left[e^{-\frac{b}{2a}\sqrt{1-\frac{ac}{4b^2}}t}-e^{+\frac{b}{2a}\sqrt{1-\frac{ac}{4b^2}}t}\right]$$

Proceeding to FIGURE 3a there is illustrated the function of the time of the regulating process of the known circuit as set forth in FIGURE 1. FIGURE 3b illustrates the function of time of the regulating system when the circuit of the present invention, as shown in FIGURE 2, is used. The abscissa represents the time with the same scale being used in both figures. The ordinate axis represents the deviation of the frequency. The resulting curves represent the function of time based on the various parameters represented by the equations appearing on the graphs.

It is readily apparent that in the known circuit as illustrated in FIGURE 3a a steady regulation is obtained between the limits $$\sqrt{1-\frac{3ac}{b}}=0 \text{ and } 0.5$$

or, when $ac/b^2$ is greater than 0.25 and less than 0.335. In the arrangement of the present invention, however, the steady state is located between 0 and 1 for the term $$\sqrt{1-\frac{4ac}{b^2}}$$

when $ac/b^2$ is between 0 and 0.25.

A comparison of the graphs of FIGURES 3a and 3b readily reveals that the steady range in the known circuit is considerably smaller than that of a control circuit based on the present invention. It is also apparent that the time required for compensating a circuit is considerably less in the present invention than in the known circuits.

FIGURE 3b also clearly shows that the amplitude of the relation as well as the time of the regulation are less than the corresponding magnitudes in the graph of FIGURE 3a. A further advantage of the present invention is that the several constants a, b, c and d can be more favorably chosen in the control process of the present invention since, as shown in FIGURE 3a, there is the relationship $$(14) \quad \left(\frac{\omega}{\Omega}-1\right)=\frac{ad}{cb}f_1(t)=\frac{Ik_0k_1k_2}{RCm_2(m_1+k_0k_1k_3)}f_1(t)$$

whereas in FIGURE 3b there is the relationship $$(15) \quad \left(\frac{\omega}{\Omega}-1\right)=\frac{ac}{b^2}f_2(t)=\frac{I(m_1+k_0k_1k_3)}{(m_2+k_0k_2k_3)^2}f_2(t)$$

In addition, the deviation caused by noise in the circuit of the present invention can be kept to a minimum by amplifying the differential portion $k_2$. This would also maintain the decay time of the interference very small.

The above-mentioned relationships possible with the present invention are all based on the proposition that a mathematically accurate differentiation can be obtained. In a differentation which is not free from errors there is always the danger that an oscillation or perhaps a de-attenuation will appear at certain frequencies. Electronic tube circuits have been employed to eleminate the errors in differentiation. However, such circuits usually require two separate sources of current and two tube circuits which requirements are not always convenient to fulfill.

Known electrical differentiators comprising a combination of a resistance and an impedance are illustrated in FIGURES 4a and 4b. The impedance may comprise either a capacitor or an inductance. If the magnitudes of the several electric components are properly chosen then the tube voltage $u_2$ can be expressed as follows $$u_2=T_z\left(\frac{du_1}{dt}-\frac{du_2}{dt}\right)$$

In this equation $T_z$ is the time constant of the differentiator. In the circuit of FIGURE 4a the time constant will be RC and in the circuit of FIGURE 4b the time constant will be $L/R$.

Accordingly, $u_2$ can be considered to be an approximate differentiation of the voltage $u_1$ only if $$\frac{du_2}{dt}\ll\frac{du_1}{dt}$$

This would also be true if R in FIGURE 4b is the internal resistance of an amplifier tube and L an inductance or a transformer in the anode circuit of the tube and $$u_1=\frac{u_g}{D}$$

wherein $u_g$ is the grid control voltage to be differentiated and D is the inverse amplification factor of the tube.

In known approximate electric differentiation as described above the error in the approximate differentiation is eliminated by applying the voltage to be differentiated to the free end of a voltage divider and to the cathode of an amplifying tube. The voltage appearing on a tap of the voltage divider is positioned in the form of an oscillating voltage between a resistance in the anode circuit and the anode.

The accurately differentiated voltage is then taken off from between the cathode of the tube and a point between the resistance and the anode and the tube or from the grid of the tube. In addition, the product of the transconductance of the tube and the internal resistance thereof is greater than 1 and preferably greater than 10.

Several forms of the improved differentiator circuit of this invention are illustrated in FIGURES 5 through 8. In these circuits the voltage appearing across the resistance $R_k$ of the tube V is practically equal to the voltake $u_2$ when the product of the transconductance $g_m$ of the tube V and $R_k$ is $\gg 1$. Then $u_2$ will be equal to $$T_z\cdot\frac{du_1}{dt}$$

$T_z$ again represents the time constant of the several components of the differentiator circuit.

In the circuit of FIGURE 5a the time constant equals RC. The voltage to be differentiated is applied to the free end of a capacitor C and to the cathode of the tube V. The accurately differentiated voltage is then taken off across the resistance $R_k$.

FIGURE 5b corresponds to FIGURE 5a but the voltage divider thereof comprises an inductance L and a resistance R. In the circuit of FIGURE 5b the resistance 12 of the LR circuit can be analogous to the internal resistance of an amplifying tube. Accordingly, $u_1$ will then equal $u_g/D$ wherein $u_g$ is the voltage to be differentiated and L is either the inductance or a transformer in the anode circuit of an amplifying tube which has an inverse amplification factor D.

In the modified differentiation of FIGURE 6 the voltage tube V is obtained by dividing a voltage at $R_1$, $R_2$ which voltage would be proportional to the input voltage $u_1$ and to the approximately differentiated voltage at $R_1C$.

An accurate differentiation can also be obtained when another voltage must be superimposed on the approximative differentiated voltage, for instance by dividing the voltage, as illustrated in FIGURE 6. In FIGURE 6, a voltage proportional to the voltage $u_1$ is to be superimposed on the differentiated voltage $$\frac{du_1}{dt}R_1C$$

In this case, the following conditions will prevail:

(17)
$$i = i_1 + i_2$$
$$u_1 + i_a R_k = iR_1 + \frac{1}{C}\int i_1 dt$$
$$i_a R_k = i_1 R_1 = u_2$$
$$i_2 R_2 = \frac{1}{C}\int i_1 dt$$

The result will be:

(18)
$$u_2 = u_1 \frac{R_1}{R_2} + \frac{du_1}{dt} R_1 C$$

From the above equations, particularly from the equation $$u_2 = T_z \cdot \frac{du_1}{dt}$$

it can be seen that $u_2$ increases, as the selected time constant $T_z$ is increased. If the internal resistance of the source of $u_1$ is sufficiently low, the increase of $T_z$ has no detrimental effect. In case of a high internal resistance of the voltage source of $u_1$, the reactive effect of the voltage obtained at the resistance $R_k$ will deform the input voltage $u_1$. For this reason, $T_z$ and the amplification of the arrangement connected therewith cannot be increased as high as desired. Yet, in general, the factor $$T_z = \frac{u_2}{du_1/dt}$$

can be chosen many times higher than at the approximative differentiation when using C and R alone.

In the embodiments shown in the FIGURES 5a and 5b the fact that the input voltage $u_1$ must be free from the ground potential might be considered as disadvantage. In comparison, however, in the embodiments of FIGURES 7a and 7b, the input voltage $u_1$ as well as the output voltage $u_2$ are related to the direct zero potential. Both circuit arrangements differ from those shown in FIGURES 5a and 5b only in that the direct current source of the amplifying tube is interpolated between the resistance $R_k$ and the cathode of the tube V. Furthermore, R or L respectively, are not directly connected to $R_k$, but through a capacitor $C_1$ and the necessary grid bias is supplied through a grid resistance $R_g$. $C_1$ has a higher magnitude as compared with C. Then the voltage $$u_2 = -T_z \cdot \frac{du_1}{dt}$$

can be taken off against ground from the anode of the valve V; the direct voltage component can be eliminated by means of a capacitor, a glow (neon) lamp or a Zener diode. In FIGURES 7a and 7b, a capacitor is drawn in the output circuit for separating the direct voltage component.

Proceeding next to FIGURE 8, there is a differentiating circuit as used in this invention. In this circuit the voltage to be differentiated is transmitted from input terminals 11, 12 through a cathode follower 13 to the free end of an approximative differentiating voltage divider 14, 15 and is applied to the cathode of an amplifier tube 16. The voltage at the tap of the voltage divider 14, 15 is positioned at the grid of the amplifier tube 16 and the base point of the voltage divider is by way of a condenser 23 positioned between a resistor 17, disposed in the anode circuit, and the anode of the tube 16. The accurately differentiated voltage $$\Delta u_2 = \frac{-d\Delta u_1}{dt}$$

is taken off between the cathode and the anode of the tube 16. The product of the transconductance of the tube and the working resistance 17 should again be greater than 1 and preferably greater than 10. There is indicated at 18 an inverter stage with a cathode follower. A resistance 19 serves for transmitting the non-differentiated voltage to output terminals 21, 27. The differentiated voltage is transmitted to the terminal 27 by a coupling capacitor 22. A capacitor 23 is inserted between the resistor 15 and the anode of the tube V to provide a path for alternating current. The grid bias is supplied from the terminal 25 by a resistance 24 and the anode potential is supplied to tube 16 from the terminal 26.

$\Delta u_1$ is the voltage to be differentiated and $$\Delta u_2 = \Delta u_1 + R \cdot C \frac{d \Delta u_1}{dt}$$

is the differential voltage combined with the control voltage $\Delta u_1$. The circuit has the advantage to differentiate accurately and to increase the differential quotient by the factor $k_2 = R \cdot C$.

Experiments made with the circuit arrangement according to the invention comprising a differential attenuator according to FIG. 2 resulted in approximately ⅕ to ¹⁄₁₀ of the decay time as compared with the circuit arrangement comprising an RC-attenuator according to FIG. 1.

Figure 9:
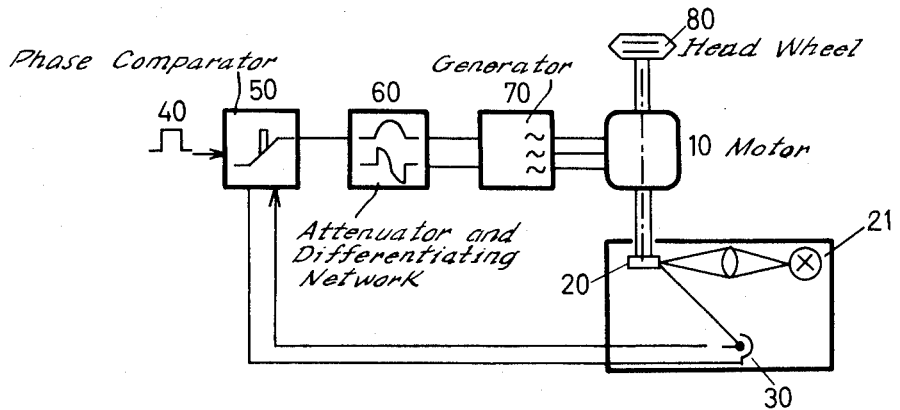
FIGURE 9 is a schematic view showing the arrangement of a motor drive for recording television signals on a tape.

FIGURES 9 to 11 illustrate some applications of the differential attenuator for the magnetic tape recording, especially of television signals.

FIGURE 9 shows the application for recording video signals on a magnetic tape. When the signals are recorded, control signals are taken off from motor 10 by a disk 20 marked black-white and scanned by a photoelectric cell 30, as can be seen from FIGURE 9. These control signals are compared in a phase comparison circuit, indicated at 50, with the synchronizing pulses 40. A control voltage is derived from the comparison. The control voltage is differentiated in the attenuator of the arrangement 60, by using the embodiment shown in FIGURE 8. A generator 70 is regulated which supplies the current for the motor 10.

FIGURES 10 and 11 show examples for the application of the differential attenuator for the synchronization of motors at the play-back of video signals from the magnetic tape.

During the play-back of the signals, the signals scanned by the head wheel 80 are compared with the synchronizing signals 40 according to FIGURES 10 and 11. In the embodiment shown in FIGURE 10, the obtained control voltage acts on the generator 70 through a differentiating attenuator 60, whereas in the embodiment shown in FIGURE 11 the control voltage acts on an eddy-current brake 90 that is supplied by an amplifier 100, and the motor 10 is developed as a self-starting synchronizing motor and therefore runs synchronous with the synchronizing pulses. In this arrangement, the generator 70 serves only as an amplifier and a converter for producing the three-phase alternating current fed to the motor 10.

In case the control voltage is obtained by a voltage comparison after repeated time intervals of the period T, this time must be shorter than ¹⁄₁₀ of the necessary shortest control duration of, for instance, ¹⁄₂₅₀ sec. and voltage leaps of the control voltage have to be compensated by a filter capacitor since otherwise the differentiation causes faulty control operations.

It will be understood that this invention is susceptible to modification in order to adapt it to different usages and conditions and, accordingly, it is desired to comprehend such modifications within this invention as may fall within the scope of the appended claim.

What is claimed is:

A system for adjusting the angular position of the rotor of an electric motor, and comprising means for producing a series of pulses from a rotating rotor, a source of a second series of synchronizing pulses, a phase discriminator receiving said series of pulses and producing a control voltage having its amplitude responsive to the phase displacement of said series of pulses, a differentiation circuit receiving said control voltage and producing an auxiliary voltage, means for adding said control voltage and said auxiliary voltage to a combined control voltage and means responsive to said combined control voltage for adjusting the angular position of said rotor, said differentiating circuit including an approximately differentiating network, an amplifier controlled by the output voltage of said approximately differentiating network, a negative feed-back path from the output of said amplifier to said approximately differentiating network so as to practically compensate for error in the differentiating process and to derive a practically error-free differentiated voltage at the output of said amplifier, said second series of synchronizing pulses having a periodicity of less than $\frac{1}{10}$ of the control time for adjusting the phase displacement so that a control voltage is produced having its amplitude as a function of the phase displacement between the said series of pulses from a rotating motor and the said second series of synchronizing pulses.

References Cited by the Examiner

UNITED STATES PATENTS

| | | | |
|---|---|---|---|
| 2,651,719 | 9/53 | White | 333—19 |
| 2,782,355 | 2/57 | Wilcox | 178—6.6 |
| 2,916,547 | 12/59 | Ginsburg et al. | 178—6.6 |
| 2,901,609 | 8/59 | Campbell | 328—127 |
| 2,977,544 | 3/61 | Schubring et al. | 328—127 |
| 3,016,428 | 1/62 | Kabell et al. | 179—100.2 |

OTHER REFERENCES

Poorman, A. P.: Applied Mechanics, New York, McGraw-Hill Book Co., Inc., 1923, pp. 198–200.

DAVID G. REDINBAUGH, *Primary Examiner.*

BERNARD KONICK, *Examiner.*